United States Patent Office 2,994,619
Patented Aug. 1, 1961

2,994,619
METHOD OF TREATING GLASS FIBERS WITH A SIZE COMPRISING AN ALKENYL TRIACYL-OXY SILANE AND A SYNTHETIC LATEX, AND GLASS FIBERS SO TREATED
George E. Eilerman, Perrysville, Pa., assignor to Pittsburgh Plate Glass Company, Allegheny County, Pa., a corporation of Pennsylvania
No Drawing.  Filed Aug. 1, 1958, Ser. No. 752,412
4 Claims.  (Cl. 117—126)

The present invention relates to a glass fiber treatment and it has particular relation to a size for treating glass fibers which are employed as a reinforcement for resins and plastics. This application is a continuation-in-part of my copending application Serial No. 543,005, filed October 26, 1955, now abandoned.

A glass fiber strand is composed of a multitude of fine glass filaments which are formed by being drawn at a high rate of speed from molten cones of glass located at the tips of small orifices in a bushing such as shown in U.S. Patent No. 2,133,238. During manufacture, the filaments are coated while moving at a rate of speed of the order of 5,000 to 20,000 feet per minute with a size which contains a binder to give the strand integrity for workability, i.e., for twisting, plying, and weaving. If the strand does not have proper integrity, fuzzing or breaking of the individual filaments occurs during these operations and eventually the strand breaks. The size also contains a lubricant for the filaments to prevent destruction of the strand by abrasion of the individual filaments against each other or against fiber handling equipment.

It is common practice to use glass fiber strands and glass fiber cloth as a reinforcement for resins. For such use, the glass fibers are coated with a coupling agent or finish material which makes the surface of the glass fibers hydrophobic and compatible with the particular resins with which they are to be employed. These coupling agents greatly increase the dry and wet flexural strengths of the glass fiber-resin laminates. When the glass fibers are to be employed in the form of woven cloth as a reinforcement for resins, the coupling agent is applied in an aqueous solution to the fibers after they have been woven into cloth and after the cloth has been cleaned to remove the size. Starch and a vegetable oil are generally employed as a size for glass fibers when they are twisted, plied, and woven into cloth. This starch must be removed prior to lamination of the glass fiber cloth with the resin because the starch prevents the formation of a strong bond between the glass and the resin.

When glass fibers are used in the form of strands, i.e., roving or chopped strands, for resin reinforcement the coupling agent is usually combined with a size and applied with the size to the fibers during their attenuation and forming. The size employed is usually an aqueous dispersion of a film forming, synthetic resin latex made by emulsion polymerization of an ethylenic monomer, for example, polyvinyl acetate latex, and a textile lubricant and softener. Roving is formed by combining a number of strands in parallel form and winding the strands on a tubular support in a manner such that the combined strands may be unwound and used to form woven roving or chopped strands. It is therefore necessary that the strand to be formed into the roving have good integrity and resistance to fuzzing during the fabrication steps employed to make the roving.

A number of materials have been used as coupling agents in glass fiber sizes. One group of materials which has found favorable use for treatment of glass fibers for resin reinforcement is known as a "chrome" finish. This material comprises a complex compound of the Werner type in which a trivalent nuclear chromium atom is coordinated with an acid such as methacrylic acid. This is further described in U.S. Patents Nos. 2,522,910 and 2,611,718.

One of the principal objections to the use of "chrome" finished glass fibers has been the green color which such treatment adds to the resin product. This green color is especially observed in glass fiber-resin extrusions where the ratio of glass to resin is high and the cross-section of the extruded piece is large. Accordingly, it is an object of the present invention to provide a treatment for glass fibers for resin reinforcement which provides increased dry and wet strengths to the resin products and enables the production of clear reinforced resin products.

The use of various organosilicon compounds as surface treating agents for glass fibers is known. The use of alkenyl and alkyl silicon halides to render glass surfaces hydrophobic is shown in U.S. Patents Nos. 2,303,222 and 2,420,912. A number of organosilicon compounds are listed in U.S. Patents Nos. 2,390,370 and 2,392,805. These compounds are stated to be useful as lubricants and binders for glass fibers.

A few organosilicon compounds have shown desirable properties for acting as coupling agents to improve the dry and wet strength of glass fiber-resin laminates. Allyl ethoxy and allylchloro silanes are disclosed for this purpose in U.S. Patent No. 2,563,288 and vinyl triethoxy silane is disclosed in U.S. Patents Nos. 2,688,006 and 2,688,007. Vinyl trichlorosilane has also been suggested for this purpose.

The use of allyl and vinyl chloro or ethoxy silanes is accompanied with many difficulties. They are difficult to prepare and use. In some instances, the silicon derivative is too reactive to use without a preliminary hydrolysis step. Products resulting from this hydrolysis remain in the finish and interfere with the refractive index at the glass interface. Some of the organosilicon compounds require excessively high temperatures to cause "fixation" on the glass fibers. This results in the requirement of specal production procedures. Other silicon derivatives require controlled hydrolysis with consequent lack of stability. Production losses are high when such materials polymerize or precipitate from solution and become unfit for application to the glass fibers.

It is highly desirable that a size which is to be applied to the filaments of the strand during the formation of the strand be usable in an aqueous solution or dispersion. Organic solvents are unsuitable for they give off vapors which are harmful to the workers operating the fiber forming process and also create a danger of fire or explosion if they accumulate and contact the hot bushing. In an aqueous size it is important to control the pH of the size in order to maintain the latex and the silane in the size in dispersion form.

In accordance with the present invention, a stable, aqueous size which can be applied to glass fiber strands during their formation and which provides the strands with improved resin reinforcing properties has been discovered. The size comprises an aqueous dispersion of a synthetic latex, a textile softener or lubricant, and an alkenyl triacyloxy silane in an aqueous medium. The size is prepared in stable form by mixing an aqueous solution of the silane and an aqueous dispersion of the latex without any additional control of the pH of the resulting mixture. In a preferred form of the invention the size is made by forming an aqueous solution of the textile softener and lubricant, adding an aqueous solution of the silane to this solution with stirring and finally adding an aqueous dispersion of the latex. The addition of the ingredients in this order provides the necessary control of the pH of the size and maintains the latex in dispersion form and the silane in solution for long periods of time. This size can be made in large quantity production batches by inexperienced factory workers without fear of spoiling whole batches because of premature condensation of the silane or agglomeration of the latex. Expensive control equipment is not necessary to make a usable size. It has also been found that the use of a size of this formulation and prepared in this manner for some reason which is not known materially reduces the amount of "fuzz" which is formed during the fabrication of the strand into roving.

Of particular interest in the practice of the invention is vinyl triacetoxy silane. The alkenyl triacyloxy silanes contemplated for use in the present invention may be illustrated by the following structural formula:

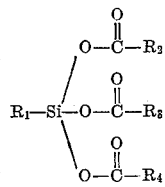

wherein $R_1$ is an alkenyl radical selected from the group consisting of vinyl and allyl radicals and $R_2$, $R_3$, and $R_4$ are alkyl or substituted alkyl radicals containing 1 to 5 carbon atoms.

Typical examples of alkenyl triacyloxy silanes which are usable in accordance with the present invention are listed below:

Vinly triacetoxy silane
Vinyl diacetoxy monopropionoxy silane
Vinyl monoacetoxy dipropionoxy silane
Allyl triacetoxy silane
Vinyl tributyroxy silane
Vinyl tripropionoxy silane
Allyl diacetoxy monopropionoxy silane
Allyl acetoxy dipropionoxy silane
Allyl tripropionoxy silane
Vinyl trimonochloroacetoxy silane, etc.

The invention is further described in conjunction with the use of vinyl triacetoxy silane as the essential ingredient of the glass fiber size, although the use of the above-described alkenyl triacyloxy silanes is contemplated in each instance. The alkenyl triacyloxy silanes which are to be used in the present invention may be produced by reaction of an alkenyl halosilane with an acid anhydride. For example, vinyl triacetoxy silane may be produced by reacting one mole vinyl trichlorosilane with three moles of acetic anhydride using triethanolamine as a catalyst for the reaction.

The following examples are illustrative of the invention:

*Example I*

Parts by weight
Aqueous dispersion of polyvinyl acetate latex
  (55% by weight solids) _____ 125
Vinyl triacetoxy silane _____ 20
High molecular weight imidazoline (textile softener and lubricant) _____ 5
Sufficient water to make 250 gallons of size formulation _____ 1,925

Two hundred fifty gallons of glass fiber size can be made by dissolving the textile softener in about 70 gallons of water maintained at a temperature of about 130–160° F. preferably at a temperature of 145–150° F. The solution of textile softener and water is thoroughly mixed by stirring. The vinyl triacetoxy silane is then poured into the above mixture and the resultant mixture is stirred for 5 to 10 minutes to ensure complete mixing. Approximately 70 gallons of water at a temperature of about 65 to 70° F. is then added while the mixing continues. The polyvinyl acetate latex is next poured into the mixture and stirred for about 5 to 10 minutes to provide complete mixing. Sufficient water to make 250 gallons of the solution is finally added. The sizing solution thus prepared has a pH of about 4 to 5 and is stable for long periods of time, for example a week or longer, with respect to the maintenance of the dispersion of the latex in the size and the prevention of the condensation and precipitation of the silane from the size. The amounts of the various ingredients are given for purposes of illustration and are not to be construed as limitations on the invention. Various amounts and concentrations of aqueous dispersion of the latex and aqueous solution of the silane can be used to provide the concentrations of the various ingredients in the size as set forth below.

The sizing solution is applied to the individual fibers just after their emergence from the bushing and prior to or at the same time they are grouped together to form a strand. A roller applicator such as shown in U.S. Patent No. 2,728,972 is usually employed to apply the size to the individual filaments prior to their being grouped into a strand. The size may also be applied to the surface of a felt pad which is conventionally used to collect the individual glass filaments into a strand. Other methods of applying a size to a strand of glass fibers may be employed.

The glass fiber size can be made by adding other film forming, glass fiber binders to the aqueous solution of the alkenyl triacyloxy silane and textile softener. These binders are latices, i.e., aqueous dispersions of synthetic resins made by aqueous emulsion polymerization of ethylenic monomers such as the various acrylates which are esters of acrylic and methacrylic acid and an aliphatic alcohol having 1 to 6 carbon atoms including, for example, methyl methacrylate and methacrylate, vinyl chloride, styrene, acrylonitrile, chlorovinyl acetate, butadiene, vinylidene chloride and various copolymers of the above monomers such as butadiene-styrene, butadiene-acrylonitrile, vinyl chloride-vinyl acetate copolymers and like materials which can be employed in latex form in aqueous dispersions as binders for glass fiber strands. These latices generally have an average particle size of 0.1 to 5 microns. A plasticizer may be used in the size with latices which tend to deposit as a brittle or discontinuous film. For example, a plasticizer may be used with latices of polyvinyl acetate, polyvinyl chloride, the polyacrylates and polystyrene whereas the plasticizer is generally not used with a butadiene-styrene latex. The plasticizer may be any known plasticizer for the various resins such as dibutyl phthalate, tricresyl phosphate, dioctyl phthalate, diisooctyl phthalate and other esters which are conventionally used as plasticizers.

Various amounts of alkenyl triacyloxy silane, latex and textile softener may be present in the sizing solution. The alkenyl triacyloxy silane such as vinyl triacetoxy silane usually constitutes from 0.3 to 2% by weight of the sizing solution. More than 2% by weight of the silane can be used, but larger amounts do not materially increase the strength characteristics of the resin laminate. The solids content of the latex may constitute 2 to 8% by weight of the solution with the total solids content of the solution not being more than about 9.5% by weight of the solution. The amount of the textile softener or lubricant which is present in the sizing solution is about 0.3 to 2% by weight. In all events, the amount of silane, latex and softener employed in the size should not exceed that amount for each constituent which will cause the viscosity of the solution to be greater than about 100 centipoises at 20° C. Solutions having a viscosity greater than 100 centipoises at 20° C. are very difficult to apply to glass fiber strands due to the very high speeds that the fibers travel during their attenuation and forming. It is preferred that the viscosity of the size be between 1 and 20 centipoises of 20° C. for best results. The pH of the solution may vary from about 3 to 8 depending on the sensitivity of the latex to precipitate from the dispersion. The more sensitive the latex is to precipitation, the higher the pH of the sizing solution. It is desired that the sizing solution have a pH of about 4 to 5 when the latex is polyvinyl acetate.

The preferred textile softener for use in the present invention is a cationic-active, acid solubilized, fatty acid amide. This material is manufactured by the Arnold Hoffman Company under the Trade Number 185A. It is an anhydrous material which is a deep reddish, amber, viscous liquid at room temperature. It is water dispersible and a 1% solution has a pH of 8.9 to 9.4. Other commercially available, acid solubilized, fatty acid amides such as stearic amide are useful as textile softeners in the practice of the invention. These include both saturated and unsaturated fatty acid amides wherein the acid group contains from 4 to 24 carbon atoms. Also included are anhydrous, acid solubilized polymers of the lower molecular weight unsaturated fatty acid amides.

Another textile softener and lubricant which can be used in the size is an alkyl imidazoline derivative which includes compounds of the class u-alkyl N-amidoalkyl imidazolines which may be formed by causing fatty acids to react with polyalkylene polyamines under conditions which produce ring closure. These imidazolines are described more fully in U.S. Patent No. 2,200,815. Other suitable imidazolines are described in U.S. Patents Nos. 2,267,965, 2,268,273, and 2,355,837.

The size may contain a wetting agent. The wetting agent is preferably cationic or non-ionic and it may also serve as an additional lubricant. Any material which is conventionally known to be useful as such and will reduce the surface tension of the sizing solution so that it is about 25 to 35 dynes per square centimeter. Such materials include cetyl or stearyl monoamine hydrochloride or acetate, dodecyl amine, hexadecyl amine and secondary and tertiary derivatives of the same, for example, dodecyl methyl amine and salts thereof. Alkyl quaternary ammonium compounds such as trimethyl stearyl or cetyl ammonium bromides and chlorides and generally any of the amine compounds that dissociate in water systems to provide a positive radical containing a group of more than 8 and preferably 12 or more carbon atoms may be used. Other examples of suitable wetting agents are polyoxyethylene derivatives of a sorbitol fatty acid ester such as polyoxyethylene sorbitan monostearate or polyoxyethylene sorbitan trioleate. The amount of such wetting agent employed generally ranges from about 0.01 to 1% by weight of the aqueous sizing solution.

Further examples of the sizing solutions contemplated by the present invention are listed below:

*Example II*

Parts by weight, pounds
Polyvinyl acetate latex (55% by weight solids) ____ 93.7
Vinyl triacetoxy silane _____ 8.8
Textile softener (anhydrous, acid solubilized fatty acid amide) _____ 4.0
Melamine-formaldehyde resin _____ 9.5
Sufficient water to make 200 gallons of the sizing formulation _____ 1634

*Example III*

Butadiene styrene latex (48% by weight solids) ___ 108
Vinyl triacetoxy silane _____ 8.8
Textile softener (anhydrous, acid solubilized, poly unsaturated lower molecular weight fatty acid amide) _____ 4.0
Sufficient water to make 200 gallons of the sizing formulation _____ 1490

*Example IV*

Poly methyl methacrylate latex (40% by weight of solids) _____ 129
Vinyl triacetoxy silane _____ 8.8
Textile softener (anhydrous, acid solubilized, stearic acid amide) _____ 4.0
Sufficient water to make 200 gallons of solution____ 1468

*Example V*

Polyvinyl acetate latex (55% by weight solids) ____ 94
Vinyl tripropionoxy silane _____ 8.8
Textile softener (anhydrous, acid solubilized, lower molecular weight fatty acid amide) _____ 4.0
Sufficient water to make 200 gallons of sizing solution _____ 1503

Glass filaments which have been coated with the sizing solutions of the invention and wound around a forming tube in the manufacture of the strands are then heated at a sufficient temperature and for a sufficient time to dry the sized strands. They may be heated at a temperature of 240° F. for eight hours. During the drying of the strand the silane is thought to react with the hydroxyl groups on the surface of the glass and provides a siloxane linkage between the silane and the glass. The treated strands may then be collected in parallel form to form roving and the roving may be wound on a tube. The roving may be woven into cloth or chopped into short lengths i.e., 2 to 5 inches and formed into a mat by means of conventional preform techniques.

The strands which have been sized with the solution and fabricated as described above provide increased flexural strength to resins reinforced with the strands. For example, laminates of chopped strand mats which were sized with vinyl triacetoxy silane and laminated with a styrenated polyester resin were compared with similar laminates of chopped strands sized with a "chrome" coupling agent. The following results were obtained:

| Coupling Agent in Size | Percent by Wt. of Resin | Flexural Strength, Pounds per Square Inch | |
|---|---|---|---|
| | | Dry | Wet |
| Vinyl triacetoxy silane | 66 | 29,612 | 17,756 |
| Methacrylate chromic chloride complex | 69.3 | 27,124 | 14,070 |

The invention is particularly useful when the glass fibers are to be used as reinforcement for low pressure thermosetting type resins, for example unsaturated polyester-ethylenic monomer resins such as shown in U.S. Patent No. 2,676,947 granted to Parker. These resins are interpolymers of (A) a polyester of a dihydric alcohol such as ethylene glycol, propylene glycol, 1,3 butylene glycol, diethylene glycol, dipropylene glycol and higher polymers of alkylene glycols, and an alpha, beta ethylenic, dicarboxylic acid such as maleic or fumaric acid with other dicarboxylic acids, such as adipic, succinic, azaleic and phthalic acids added and (B) a monomer, soluble in the polyester, containing a terminal ethylenic group, $CH_2=C<$, such as styrene, vinyl acetate, vinyl toluene, allyl esters including allyl acetate, allyl succinate, diallyl phthalate, diallyl cyanurate, triallyl cyanurate, dichloro styrene, etc. The invention is also useful when the glass fibers are to be laminated with other resinous or plastic materials such as polyether or epoxy resins which are condensation polymers of an epihalohydrin and a polyhydroxy phenolic compound and derivatives thereof such as bis-phenol A.

The present invention provides an improved, stable, aqueous glass fiber textile size which is especially easy to prepare and which is useful for application to fibers which are to serve as reinforcement for synthetic organic resins. The size is stable with respect to both the latex ingredient and the silane ingredient contained therein. The use of the alkenyl triacyloxy silane in the aqueous size provides the proper pH control to give stability to the size without requiring additional steps or usage of acids or bases to change or regulate the pH of the solution during its manufacture or during storage.

Although the present invention has been described with respect to specific details of certain embodiments thereof, it is not intended that such details act as limitations upon

I claim:

1. A method of treating glass fiber strands during their formation to render them more compatible with resins which comprises applying to the strands a stable, aqueous treating solution consisting essentially of water having dissolved therein a compound represented by the formula

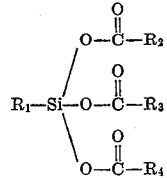

wherein $R_1$ is an alkenyl radical selected from the group consisting of vinyl and allyl radicals and $R_2$, $R_3$ and $R_4$ are alkyl radicals containing from 1 to 5 carbon atoms, and having dispersed therein a synthetic resin latex made by emulsion polymerization of an ethylenic monomer, water being the sole solvent and dispersing means, the viscosity of the treating solution being less than about 100 centipoises at 20° C., and drying the treated strands.

2. The method of claim 1 wherein the latex is polyvinyl acetate and the compound is vinyl triacetoxy silane.

3. A glass fiber strand which has been treated according to the method described in claim 1.

4. A method of treating glass fiber strands during their formation to render them more compatible with resins which comprises applying to the strands a stable aqueous treating solution consisting essentially of water having dissolved therein a compound represented by the formula

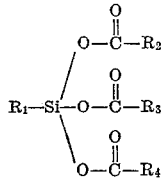

wherein $R_1$ is an alkenyl radical selected from the group consisting of vinyl and allyl radicals and $R_2$, $R_3$ and $R_4$ are alkyl radicals containing from 1 to 5 carbon atoms, and having dispersed therein a textile softener and a synthetic resin latex made by emulsion polymerization of an ethylenic monomer, water being the sole solvent and dispersing medium, the viscosity of the treating solution being less than about 100 centipoises at 20° C., and drying the treated strands.

References Cited in the file of this patent

UNITED STATES PATENTS

| | | |
|---|---|---|
| 2,688,007 | Steinman | Aug. 31, 1954 |
| 2,754,237 | Brooks | July 10, 1956 |